United States Patent [19]

Nystuen et al.

[11] Patent Number: 4,626,147
[45] Date of Patent: Dec. 2, 1986

[54] METHOD OF AND APPARATUS FOR BALANCING A ROTARY BODY

[75] Inventors: Arne M. Nystuen, Lincoln Township, Berrien County; John M. Kuss, St. Joseph Township, Berrien County, both of Mich.

[73] Assignee: Whirlpool Corporation, Benton Harbor, Mich.

[21] Appl. No.: 657,255

[22] Filed: Oct. 3, 1984

[51] Int. Cl.[4] .......................... B23C 3/00; G01M 1/22
[52] U.S. Cl. ...................................... 409/133; 73/462; 73/468; 364/508; 408/2
[58] Field of Search ............... 29/33 R, 558; 409/133; 408/2, 12; 73/462, 464, 458, 460, 459, 468, 487, 477; 364/508

[56] References Cited

U.S. PATENT DOCUMENTS

| | | | |
|---|---|---|---|
| 2,779,217 | 1/1957 | Stovall et al. | 408/2 |
| 3,854,339 | 12/1974 | Muller | 73/462 |
| 4,162,633 | 7/1979 | Muller | 73/462 |
| 4,214,481 | 7/1980 | Reutlinger | 73/462 |
| 4,238,960 | 12/1980 | Curtis et al. | 73/462 |
| 4,442,712 | 4/1984 | Junck et al. | 409/133 X |
| 4,475,393 | 10/1984 | Reutlinger | 73/462 |
| 4,482,963 | 11/1984 | Lenaham | 364/508 |
| 4,495,811 | 1/1985 | Müller et al. | 73/462 |
| 4,506,133 | 3/1985 | Inoue | 73/468 |

FOREIGN PATENT DOCUMENTS

| | | | |
|---|---|---|---|
| 1221814 | 7/1966 | Fed. Rep. of Germany | 73/468 |
| 130984 | 10/1979 | Japan | 73/468 |
| 744295 | 2/1956 | United Kingdom | 73/460 |
| 1156637 | 7/1969 | United Kingdom | 73/468 |
| 571723 | 9/1977 | U.S.S.R. | 73/468 |
| 599173 | 3/1978 | U.S.S.R. | 408/2 |

Primary Examiner—William R. Briggs
Attorney, Agent, or Firm—Wood, Dalton, Phillips, Mason & Rowe

[57] ABSTRACT

A method of and apparatus for balancing a rotary body is disclosed. The apparatus includes an unbalance detection unit which rotates the body in first and second spaced bearings, the location of the first and second bearings defining first and second bearing planes, respectively. The forces developed by rotation of the body are sensed at the first and second bearing planes and the forces about the first bearing plane are summed to determine the weight and angular location of a mass compensation which, if effected, would substantially statically balance the body. An iterative technique is utilized which determines the axial location of the mass to be removed or added which would reduce to a minimum the dynamic unbalance of the body. The body is then passed to an unbalance correction unit which removes or adds the mass at the determined angular and axial locations to minimize the static and dynamic unbalances. Should a single addition or removal of mass be insufficient to reduce the dynamic unbalance to an acceptable level, additional mass compensations can be carried out to minimize the unbalance.

29 Claims, 17 Drawing Figures

METHOD OF AND APPARATUS FOR BALANCING A ROTARY BODY

DESCRIPTION

1. Technical Field

The present invention relates generally to a method and apparatus for balancing a rotary body or part, such as a motor armature.

2. Background Art

It has been found that the useful life of an apparatus utilizing a rotating body is shortened if the body is unbalanced. For example, if an armature of a motor is unbalanced, the armature will tend to vibrate the motor through the bearings which support the armature, with the degree of vibration being dependent upon the magnitude of the unbalance. This vibration not only results in wear of the bearings but also increases the noise level of the motor.

One prior type of machine for balancing a rotating body is disclosed in Muller U.S. Pat. No. 4,162,633. This balancing machine includes first and second load cells for sensing the unbalance at a pair of bearings supporting the rotating body and develops unbalance values which are used to machine the rotating body to thereby place it in balance.

The above-described Muller balancing machine is only operative to detect and correct static unbalance. The failure to detect and correct dynamic unbalance can result in a rotating body which, although statically balanced, may still cause premature failure of the apparatus within which it is used owing to the vibration induced by the dynamic unbalance.

Furthermore, prior balancing apparatus which correct an unbalance condition by mass compensation in the form of milling or cutting a portion of the rotating body away fail to take into account the spaces or voids in the material of the rotating body itself, thereby resulting in an inaccurate balancing operation.

Also, prior balancing machines are generally capable of only limited balancing since mass compensation is effected at only one point on the rotating body. Hence, these machines may not be capable of correcting a relatively extreme unbalance condition.

SUMMARY OF THE INVENTION

In accordance with the present invention, a method of and apparatus for balancing a rotating body determines the proper number and position of mass compensation points on the rotating body and effects mass compensation at these points to reduce the static and dynamic unbalances to a minimum.

The balancing apparatus includes an unbalance detection unit which includes means for supporting the rotating body in first and second spaced bearings, the location of the first and second bearings defining first and second bearing planes, respectively. The apparatus further includes means for rotating the body in the bearings and means for developing signals representing the forces in the first and second bearing planes caused by rotation of the body. These signals are coupled to a computer which includes means for summing the forces about the first bearing plane to determine the weight and angular location of a mass which, if added to or removed from the body, would substantially statically balance the body. Further means in the computer determine an optimal axial location of the mass to be added or removed which reduces to a minimum the dynamic unbalance of the body.

The computer is also coupled to an unbalance correction unit which, in the preferred embodiment, includes a cylindrical mill which is automatically operated under the control of the computer to remove the mass at the determined location.

If a single mass compensation is insufficient to reduce the unbalance below a specified level, additional mass compensations can be effected to further improve the balance of the part.

Furthermore, the apparatus and process of the present invention are operative to take into account the presence of voids or spaces in the rotary body, such as slots in an armature, so that accurate balancing is assured.

DESCRIPTION OF THE PREFERRED EMBODIMENT

Figure 1:
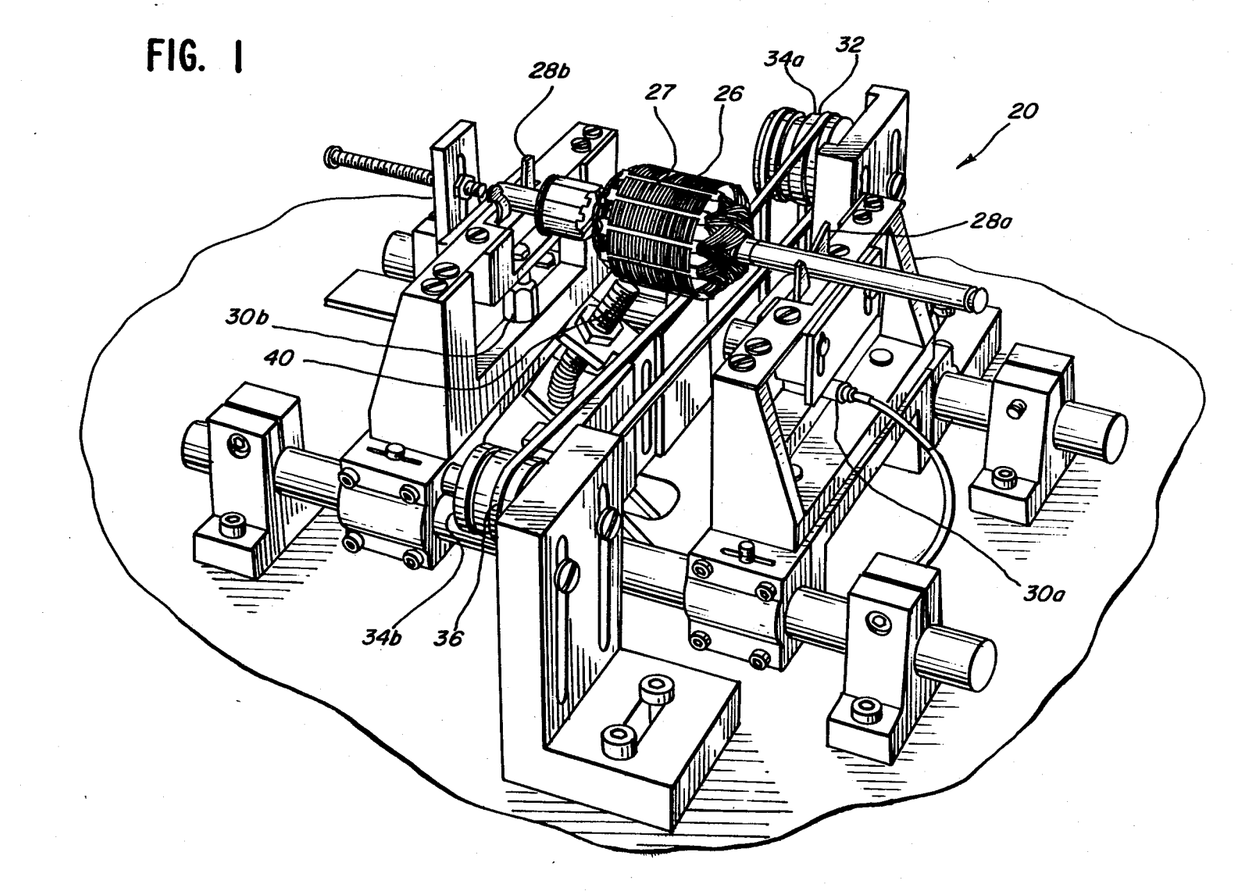
FIG. 1 is a perspective view of an unbalance detection unit according to the present invention.
Figure 2:
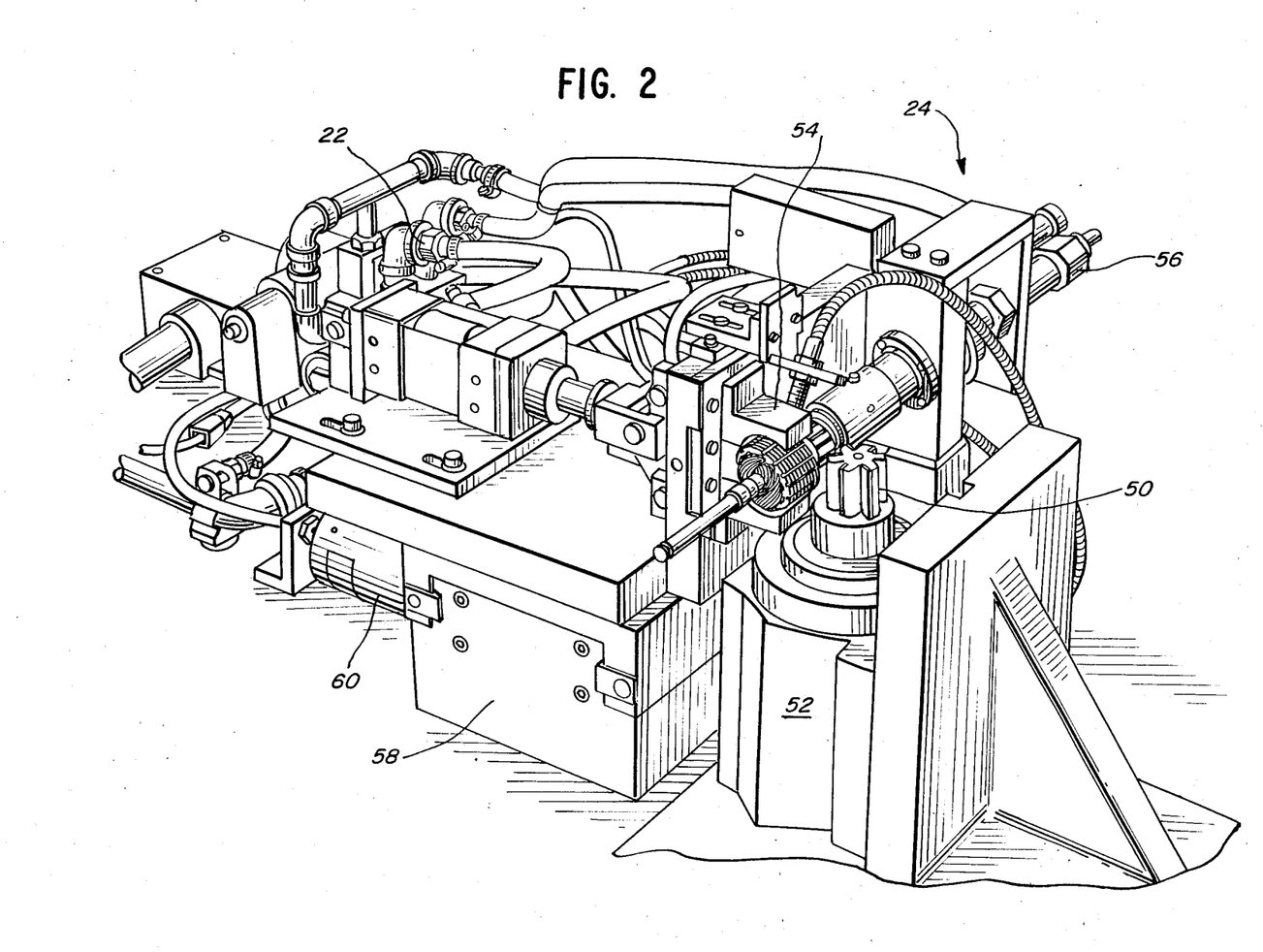
FIG. 2 is a perspective view of an unbalance correction unit of the present invention.
Figures 3, 4:
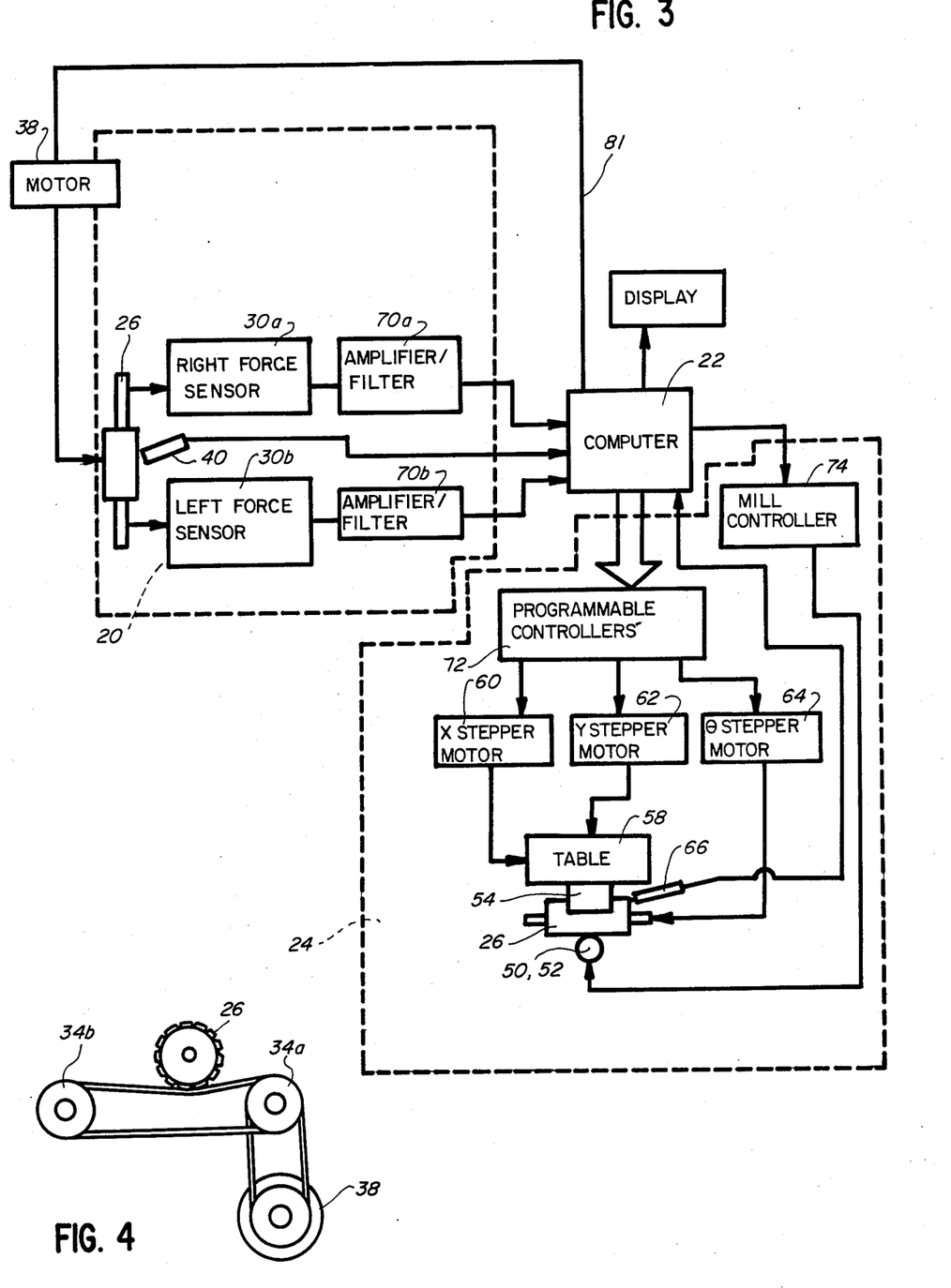
FIG. 3 is a block diagram of the balancing apparatus of the present invention.
FIG. 4 is a diagrammatic view of the idlers and armature shown in FIG. 1 in conjunction with a motor for driving same.

Referring now to FIGS. 1–3, there is illustrated an unbalance detection unit 20 (FIGS. 1 and 3) connected by means of a computer 22 (FIG. 3) to an unbalance correction unit 24 (FIGS. 2 and 3).

Referring specifically to FIG. 1, the unbalance detection unit of the present invention includes means for supporting a rotary body or part such as an armature 26 at a pair of spaced points comprising first and second bearings 28a,28b which define first and second bearing planes, respectively. Coupled to each of the bearings 28a,28b is one of a pair of force transducers 30a,30b, respectively, which develop signals representing the forces on the bearings. In the preferred embodiment, the force transducers are piezoelectric transducers which are mounted beneath and are coupled to the bearings 28a,28b.

A friction drive 32 comprises means for rotating the armature 26 in the bearings 28. The friction drive 32 includes first and second idlers 34a,34b which are coupled together by means of an elastomeric O-ring 36. The idlers 34 are in turn driven by a motor 38, shown in FIG. 4.

The rubber O-ring 36 engages the armature 26 so that the motor rotates the armature in the bearings 28 at a speed in a range preferably between 1800 and 2200 rpm.

The unbalance detection unit also includes an optical sensor 40 which is disposed adjacent the armature 26 and which is adapted to sense a paint mark applied to a coil lamination stack 27 of the armature 26. The optical sensor 40 is utilized to detect the angular position of the armature 26 during rotation and is also utilized to detect the speed of rotation of the armature 26 as it is being driven by the motor 38.

Referring specifically to FIG. 2, the unbalance correction unit 24 includes a cylindrical milling cutter 50 which is driven by a motor 52. The armature 26, following detection of unbalance, is transferred from the detection unit 20 to an armature clamp 54 of the unbalance correction unit 24 which are operated to grasp or release the armature. The clamp 54 is in turn mounted on a movable X-Y table 58, the position of which is adjusted by two stepper motors 60,62, both of which are seen in FIG. 3. The stepper motor 60 controls the X direction of movement of the table 58 while the stepper motor 62 controls the movement of the table in the Y direction.

A third stepper motor 64 (shown in FIG. 3) engages the armature and moves it about its rotational axis before the armature 26 is engaged by the clamp 54. The rotational position of the armature is sensed by means of an optical sensor 66 which senses the previously described paint mark on the armature 26 and transmits this information to the computer 22.

Referring specifically to FIG. 3, the outputs from the force sensors 30a,30b are processed by amplifers/filters 70a,70b, respectively, before being transmitted to the computer 22.

The computer 22 operates the stepper motors 60, 62,64 and the milling cutter 50 through programmable controllers 72,74, respectively.

In general terms, the above-described apparatus detects an unbalance condition and minimizes the unbalance as follows. The armature 26 is rotated by the friction drive 32. The force sensors 30a,30b develop signals which indicate the forces at the first and second, or left and right bearing planes, designated LT and RT, respectively. The signals developed by the force sensors are processed by the amplifiers/filters 70a,70b and are transmitted to the computer 22 along with the position and speed information developed by the optical sensor 40. The computer 22 converts these signals into quantitative values of forces and angles and determines the number, amount and location(s) of mass compensations to be effected. These data are coupled to the controllers 72,74 to locate the armature 26 relative to the milling cutter 50 and operate the cutter so that the appropriate portion(s) of metal is (are) removed.

The armature 26 can then be subsequently rechecked by the detection unit 20 to verify that it is within preestablished balance limits.

Figure 5A:
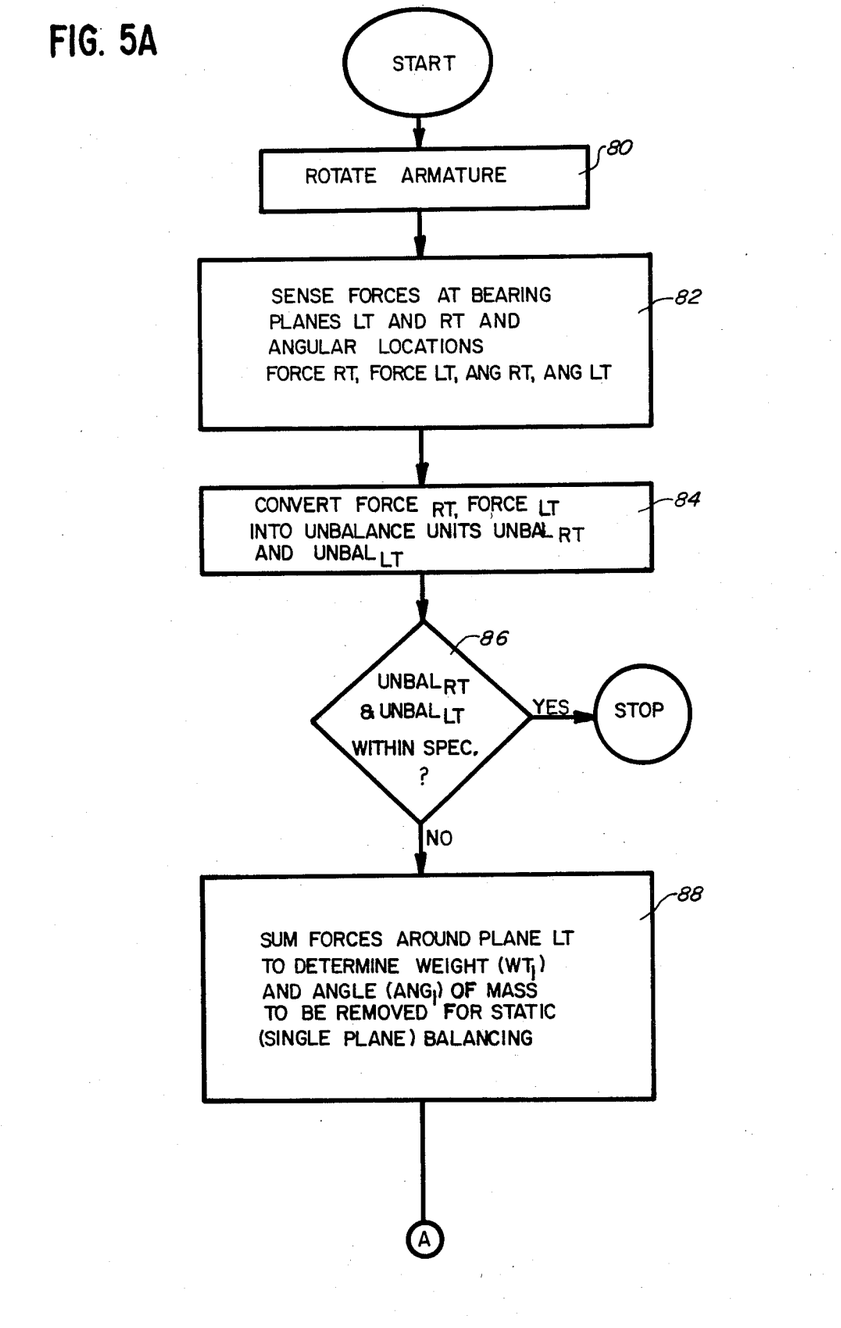
FIGS. 5a–5d, when joined along similarly lettered lines, together comprise a flow chart of programming contained within the computer shown in block diagram form in FIG. 3.

Referring now specifically to the flow chart of FIG. 5a, once a paint mark has been applied to the armature and the armature has been placed in the bearings, the method of the present invention begins at a block 80 which energizes the motor 38 over a line 81, FIG. 3, to rotate the armature 26. A block 82 then enables inputs to the computer 22 so that the computer senses the signals from the force sensors 30 and the optical sensor 40. The computer analyzes the signals developed by the sensors 30 and detects the angular position of the armature 26 when a maximum force is detected by the sensors 30. The computer develops values for the magnitudes of the forces at the bearing planes, designated $FORCE_{RT}$ and $FORCE_{LT}$. The computer 22 also develops values representing the angles relative to the mark on the armature at which the maximum forces occurred at each bearing plane. These angles are designated $ANG_{LT}$ and $ANG_{RT}$.

A block 84 then converts the values $FORCE_{RT}$ and $FORCE_{LT}$ into units of unbalance by means of the equation $$UNBAL_x = K(FORCE_x) \text{ (rpm}^2\text{)}$$

where x is either RT or LT, K is a constant and rpm is the speed of rotation of the armature 26 as detected by the optical sensor 40.

A block 86 checks to determine whether the values $UNBAL_{RT}$ and $UNBAL_{LT}$ are within specified limits. If they are both within the specified limits, the process is terminated since the armature is found to be acceptably balanced. On the other hand, if one or both of $UNBAL_{RT}$ or $UNBAL_{LT}$ is not within the specification, control passes to a block 88.

Figure 6A:
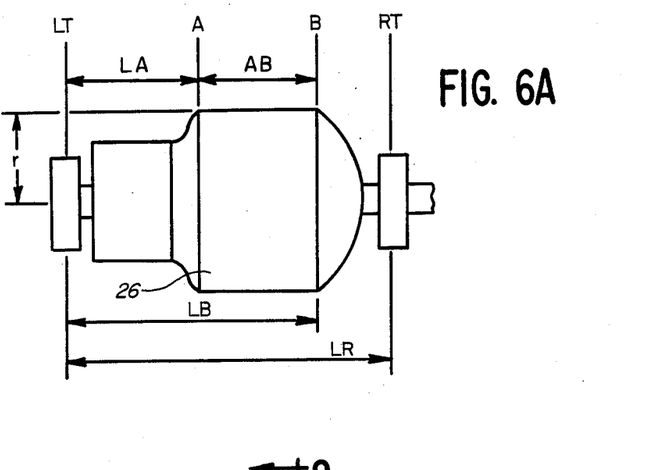
FIG. 6a is an elevational view of an armature.

The block 88 sums the forces about plane LT in order to determine the weight $WT_1$ and the angle $ANG_1$ of the mass which, if removed (or added 180° opposite to $ANG_1$), would substantially statically balance the armature 26. This summation of forces about the plane LT is briefly described with reference to FIG. 6. A more detailed analysis may be found in "Kinematics and Dynamics of Machines" by G. H. Martin (McGraw-Hill, 1969).

Figure 6B:
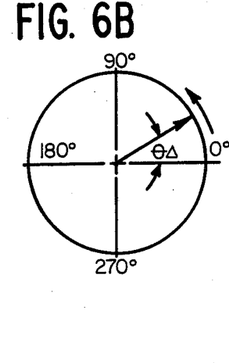
FIG. 6b is an illustration of the coordinate system in which angles on the armature are determined.

As seen in FIG. 6, the end of the lamination stack of the armature 26 closest to the plane LT is designated plane A while the other end of the lamination stack is designated plane B. As viewed from the left of the armature as seen in FIG. 6b, zero degrees is at the three o'clock position of the armature and increasing angles are subtended in the counterclockwise direction.

Static balance for a rotating body is obtained if the vertical and horizontal components of the sum of the moments of the weights about the axis of rotation is zero. In other words:

$$\Sigma W_{LT} R \sin ANG_{LT} + W_E R \sin \theta_E = 0 \qquad (2)$$

$$\Sigma W_{LT} R \cos ANG_{LT} + W_E R \cos \theta_E = 0 \qquad (3)$$

where $W_{LT}$ is the weight of the unbalance at the angle $ANG_{LT}$ derived from the value $UNBAL_{LT}$ found by the block 84, R is the radius of the armature and $W_E$ is the weight which must be removed at radius R and angle $\theta_E$ in order to achieve static balance. These equations are solved by the block 88 for the values $W_E$ and $\theta_E$.

Figure 5B:
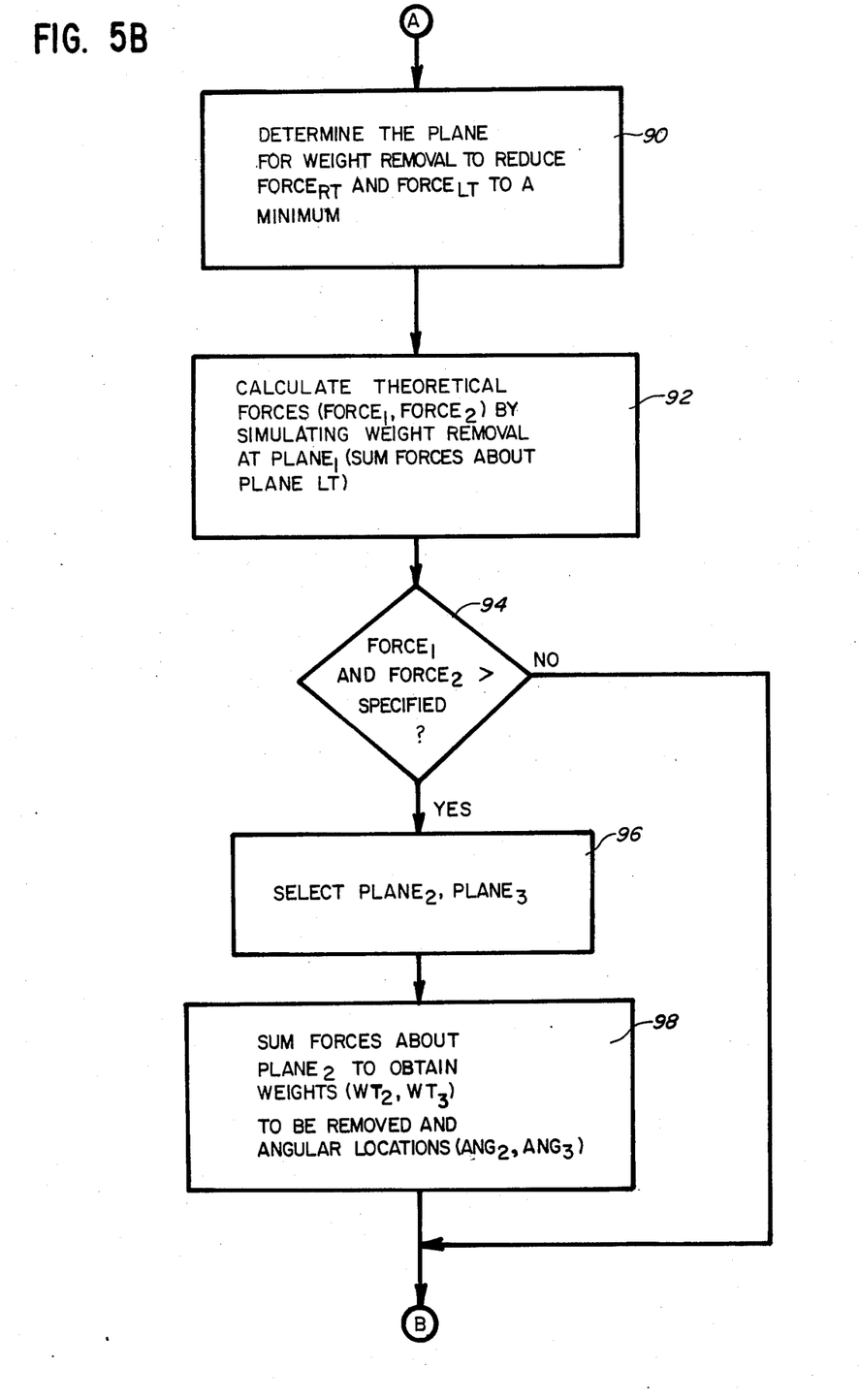

Referring to FIG. 5b, a block 90 then selects various axial planes between the planes A and B and determines in which plane mass should be removed to reduce the forces $FORCE_{RT}$ and $FORCE_{LT}$ to a minimum. This is accomplished using an iterative technique wherein the first step in the iteration is to assume that the weight $W_E$ is removed at the angle $\theta_E$ at a point adjacent the plane A. The resulting forces are then summed about the planes LT and RT to derive new values for $FORCE_{LT}$ and $FORCE_{RT}$. The next step in the iteration is to assume that the mass $W_E$ is removed from a point a predetermined incremental distance to the right of the plane LT. The forces $FORCE_{LT}$ and $FORCE_{RT}$ are then recalculated and compared against the previous result. The iteration continues until a plane, designated PLANE$_1$, is found at which point the forces $FORCE_{LT}$ and $FORCE_{RT}$ are at a minimum.

A block 92 then theoretically sums the forces about the plane LT assuming removal of the mass $W_E$ at PLANE$_1$. The result generated by the block 92, designated FORCE$_1$ and FORCE$_2$ are the minimum static and dynamic forces which can be achieved when a single mass compensation or cut is effected.

A block 94 then compares the values of FORCE$_1$ and FORCE$_2$ against predetermined specified limits, and if one or both of these forces are greater than the specified limits, then control passes to a block 96. In this case, it has been determined that a single mass removal will not reduce the unbalance to an acceptable level. Accordingly, the block 96 selects two planes, designated PLANE$_2$ and PLANE$_3$ for mass removal. The location of PLANE$_2$ and PLANE$_3$ are selected in advance keeping in mind the axial length of the lamination stack of the armature 26. In general, it is desirable to select these planes to be as far apart as possible so that the cuts do not overlap. In the usual case, one of these cuts is a simple depth cut (i.e. no axial travel of the cutter 50) while the other cut may be either a simple depth cut or a combined depth and axial cut. Therefore, it is necessary when choosing the location of the planes for mass compensation to consider the possibility that one of the cuts may be a combined axial and depth cut and to insure that no portion of the combined cut overlap any portion of another cut.

Once the planes PLANE$_2$ and PLANE$_3$ are selected by the block 96, a block 98 sums the forces about PLANE$_2$ to obtain the weights, designated WT$_2$, WT$_3$, of armature material to be removed and the angular locations thereof, designated ANG$_2$, ANG$_3$. The weight WT$_2$ and angle ANG$_2$ are selected to reduce the dynamic forces to a minimum. The mass compensation in this case may be effected by a combined axial and depth cut to achieve the required compensation. Once the weight and angle WT$_2$ and ANG$_2$ have been determined, the block 98 determines the values WT$_3$ and ANG$_3$ to eliminate any static unbalance remaining after the mass removal of mass WT$_2$ at angle ANG$_2$. Normally, this additional mass compensation is effected by a simple depth cut, although it should be noted that the cut can also be combined axial and depth cut.

Figure 5C:
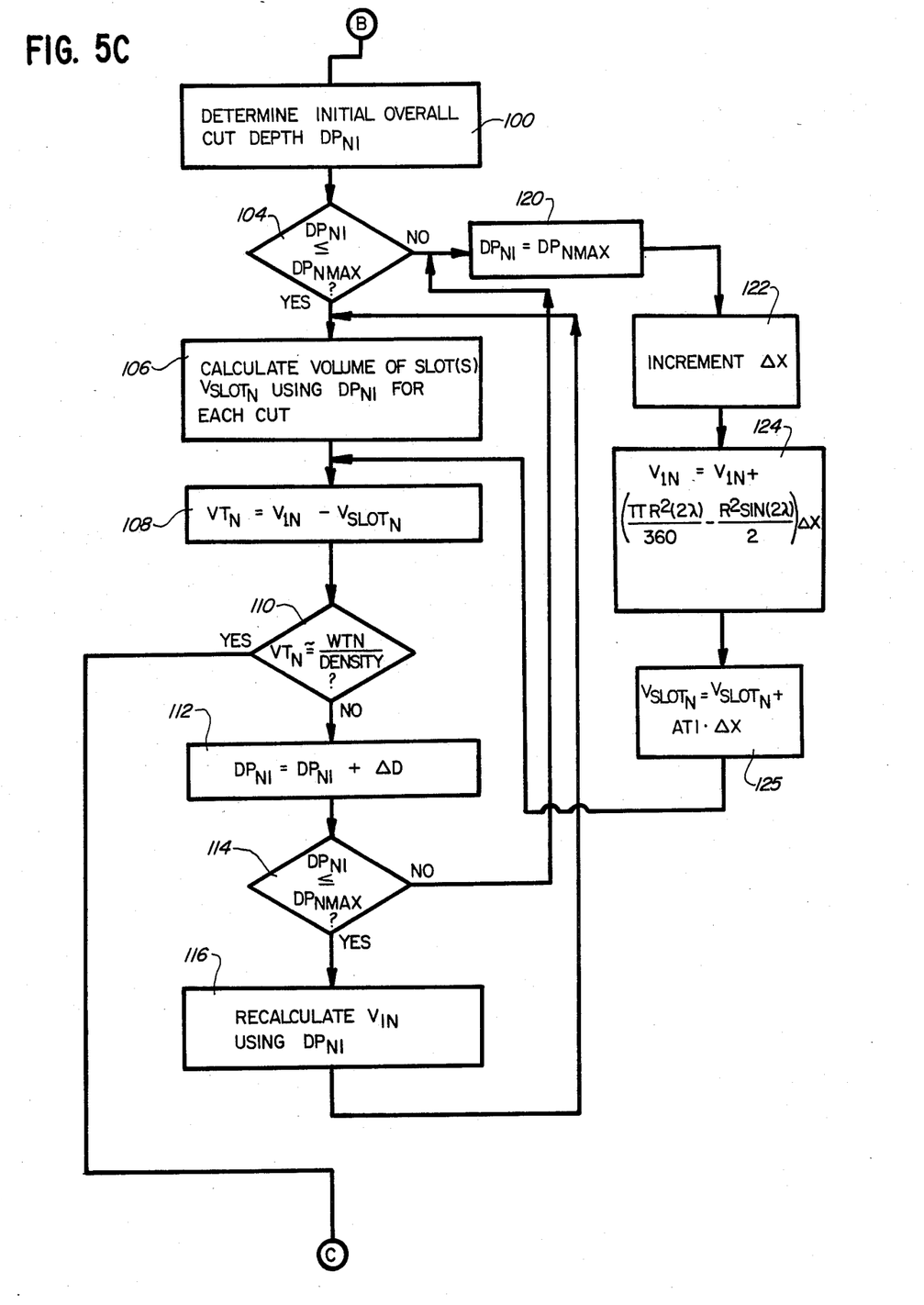

Following the block 98, or the block 94 if it determines that the values of FORCE$_1$ and FORCE$_2$ are less than the specified limits, a block 100, FIG. 5c, calculates an initial value for the depth of the cut(s) required to effect the mass compensation which will reduce the static and dynamic unbalances to a minimum. In order to calculate the depth of the cut(s), designated DP$_N$, where N=1 in the event of a single cut, or N=2 or 3 (or greater) in the case of multiple cuts, it is necessary to know in advance the configuration of the element which effects the mass removal, the radius and density of the armature lamination material and the cross-sectional configuration of the armature lamination material, since this generally includes slots which must be taken into account in order to achieve reasonable accuracy.

Figures 7, 8A, 8B, 8C, 9:
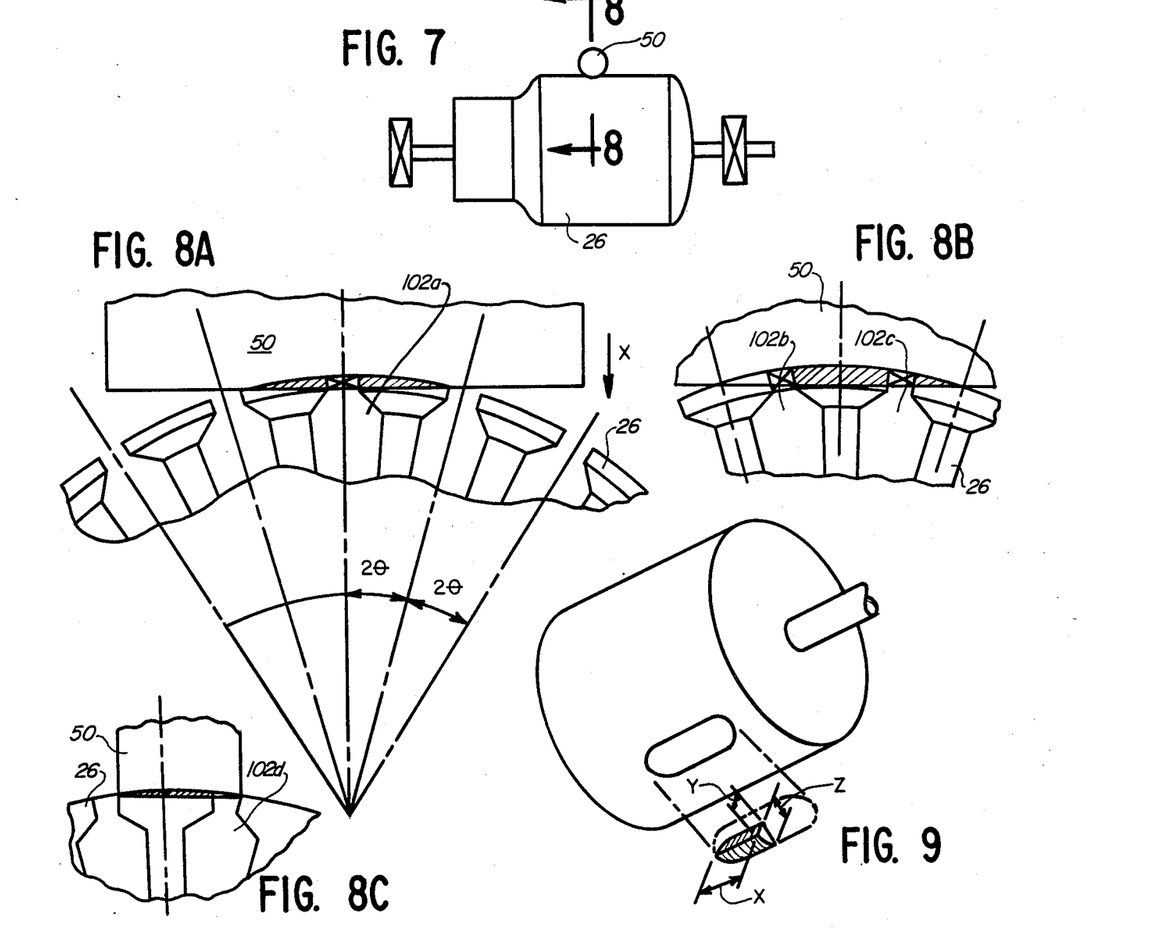
FIG. 7 is an elevational view of a milling cutter engaging an armature such as that shown in FIG. 6.
FIGS. 8a–8c are sectional views of the armature of FIG. 6 engaged by a milling cutter.
FIG. 9 is an enlarged view of a portion of the volume of the armature removed by the milling cutter.

Ignoring the pressure of the armature slots, the depth of each cut DP$_N$ is found from equations defining the volume which must be removed from the armature in order to remove the weight(s) WT$_N$ (where N=1, 2 or 3). This is accomplished by setting an equation representing the volume of two intersecting cylinders equal to an equation defining the volume to be removed as a function of weight. In other words:

$$V_{1N} = 4 \int_0^x dx \int_{R-DP_N}^R (R^2 - DP_N^2)^{\frac{1}{2}} dDP_N = \frac{WT_N}{DENSITY} \quad (4)$$

where, as seen in FIG. 9,:
x = one-half the total length of the cut along the axial direction of the armature
R = radius of armature
DP$_N$ = depth of cut (where N=1, 2 or 3)

The second integral of the above equation can be written as follows:

$$F(DP_N) = \int (R^2 - DP_N^2)^{\frac{1}{2}} dDP_N = \quad (5)$$

$$\frac{1}{2} \left[ DP_N(R^2 - DP_N^2)^{\frac{1}{2}} + R^2 \sin^{-1} \frac{DP_N}{R} \right]$$

Therefore, the volume equation can be rewritten as:

$$V_{1N} = 4 \int_0^x [F(R) - F(DP_N(x))] dx \quad (6)$$

$$V_{1N} = 4 \left[ F(R)x - \int_0^x F(DP_N(x)) dx \right] \quad (7)$$

$$V_{1N} = \pi R^2 x - 4 \int_0^x F(DP_N(x)) dx \quad (8)$$

The integral of this last equation contains a term requiring the solution of an arc sin operation and hence cannot be solved directly. Instead Simpson's Rule is utilized to develop an approximation to the solution of the integral. Simpson's Rule states:

$$\int_{x_0}^x f(x) dx = \frac{h}{3} [f(x_0) + 4f(x_1) + f(x_2) + 4f(x_3) + \ldots] \quad (9)$$

In the present example, the block 100 selects h equal to x/1000 and calculates the result of the integral using Simpson's Rule to calculate the initial value for the depth of cut DP$_N$.

In general, the density of the lamination material and the cross-sectional configuration of the slots in the laminations are known. Furthermore, the radius of the cylindrical milling cutter is also known as is the maximum depth of cut DP$_{NMAX}$ that can be accomplished without weakening the laminations and/or cutting into the armature windings. However, since the depth of cut is not known in advance, and since the angle at which the cut is to be effected relative to the paint mark may vary from armature to armature, it will generally not be known as to what portion of one or more slots will be included within the cut(s). For example, referring to FIG. 8a, the milling cutter may intercept an approximately trapezoidal portion (when viewed in cross-section) of a slot 102a, which portion must be taken into account when calculating the depth of cut based upon the weight which must be removed. Alternatively, as seen in FIG. 8b, the mill may intercept two slots 102b, 102c having approximately trapezoidal cross-sectional areas if the depth of cut is sufficiently deep so that the mill face extends across the two slots.

A still further example is illustrated in FIG. 8c in which the mill face extends across an armature tooth and all or part of a slot 102d adjacent thereto. In this case, the slot portion intercepted by the mill is approximately triangular in cross-section.

It is therefore necessary that the portions of one or more slots which are intercepted by the milling cutter 50 be taken into account when calculating the cutting or weight compensation parameters.

Referring again specifically to FIG. 5c, following the block 100, a block 104 checks to determine whether the value of $DP_N$ is less than or equal to $DP_{NMAX}$. If this is the case, then the calculated depth of cut is less than or equal to the maximum allowable depth of cut. Control then passes to a block 106 which calculates the slot volume, designed $V_{SLOTN}$ for each cut using the initial value of $DP_N$.

Figure 10:
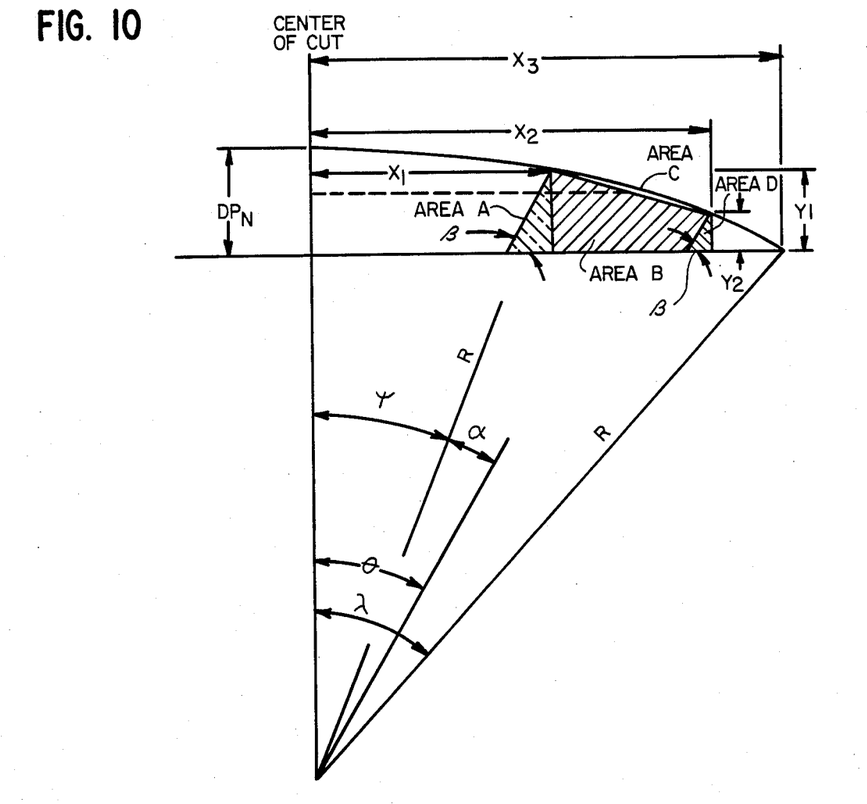
FIG. 10 is a fragmentary sectional view of an armature similar to FIGS. 8a–8c, illustrating a generalized view of the cross-sectional area of a slot intercepted by a cylindrical cutter which cuts to a depth $DP_N$.

Since, as previously noted, it is not known in advance what slot configuration would be intercepted by the milling cutter for a particular depth of cut, a generalized slot cross-sectional area at the axial center of the cut is shown in FIG. 10. The cross-sectional area of one slot intercepted by the cutter 50 is found by solving various equations. First, an angle $\Psi$ is found as follows:

$$\Psi = \theta - \alpha \quad (10)$$

where $\theta$ = angle between the centerline of a cut and the centerline of an adjacent slot and $\alpha$ is the angle between the centerline of a slot and the edge of an adjacent tooth.

The angle $\Psi$ is used to calculate distances $x_1$ and $y_1$ as follows:

$$x_1 = R \sin \Psi \quad (11)$$

$$y_1 = R \cos \Psi - (R - DP_{N1}) \quad (12)$$

where R is the radius of the armature and $DP_{N1}$ is, as previously noted, the depth of cut at the deepest portion of the cut.

Two additional values $x_2$ and $y_2$ are calculated as follows:

$$x_2 = R \sin(\theta + \alpha) \quad (13)$$

$$y_2 = R \cos(\theta + \alpha) - (R - DP_{N1}) \quad (14)$$

The values $x_1, x_2, y_1, y_2$ are utilized to calculate areas A–D:

$$\text{AREA } A = \frac{(y_1)^2}{2 \tan \beta} \quad (15)$$

$$\text{AREA } D = \frac{(y_2)^2}{2 \tan \beta} \quad (16)$$

$$\text{AREA } B = \frac{(x_2 - x_1)(y_1 + y_2)}{2} - \text{AREA } D \quad (17)$$

$$\text{AREA } C = \frac{\pi R^2 \mu}{360} - \frac{R^2 \sin \mu}{2} \quad (18)$$

where $\beta = 90 - \theta$ and $\mu = 2\alpha$. The total area for a slot in a particular axial plane intercepted by a cylindrical cutter at a depth $DP_{N1}$ is:

$$A_{T1} = \text{SLOT TOTAL AREA} = \text{AREA } A + \text{AREA } B + \text{AREA } C \quad (19)$$

Figure 11:
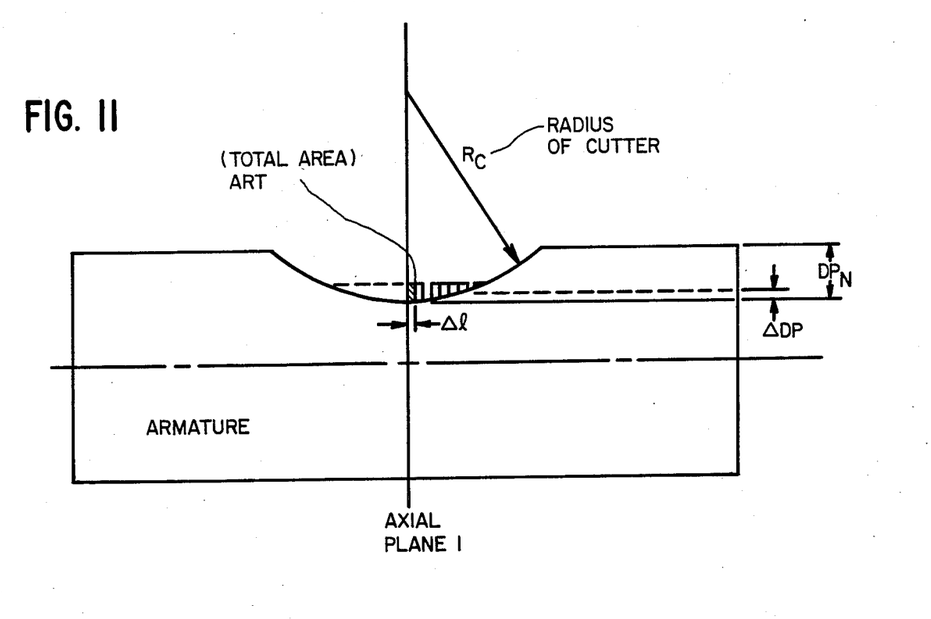
FIG. 11 is a schematic elevational view of an armature after cutting by a cutter to a depth $DP_N$.

As previously noted, this total area is computed in the axial plane at the center of the cut, i.e. that plane designated axial plane 1 in FIG. 11 containing the deepest portion of the cut as illustrated in FIGS. 8a–8c. In order to derive an approximate measure of the volume of the cut, it is necessary to find the cross-sectional areas for each slot intercepted by the cutter in axial planes spaced at small increments along the axial extent of the slot, multiply each area by the increment and add together the resulting values. That is, as illustrated by FIG. 11:

$$V_{SLOTN} = \sum_{i=1}^{n} A_{Ti} \Delta l \quad (20)$$

where $A_{Ti}$ is the total slot area for a slot at axial plane i, $\Delta l$ is the width of each increment and n is an arbitrary number representing the number of increments along the axial extent of the slot. In general n should be a large number so that $\Delta l$ is small, e.g. on the order of $1 \times 10^{-4}$ inches.

The above calculations have already yielded the value $A_{T1}$. In order to calculate the values $A_{T2}$ through $A_{Ti}$, it is necessary to derive values for a quantity $DP_{Ni}$ as follows:

$$DP_{Ni} = DP_{Ni-1} - \Delta DP \quad (21)$$

where:

$$\Delta DP = RC - [RC^2 - \Delta l^2]^{\frac{1}{2}} \quad (22)$$

and RC is the radius of the cutter 50. For example, the value $DP_{N2}$, i.e. the depth of the cut intersecting a slot in an axial plane $\Delta l$ to the right of the axial plane 1 seen in FIG. 11 is equal to:

$$DP_{N2} = DP_{N1} - \Delta DP = DP_{N1} - (RC - [RC^2 - \Delta l^2]^{\frac{1}{2}}) \quad (23)$$

Once each new value $DP_{Ni}$ has been calculated, the equations (10)–(19) above are recalculated substituting the value $DP_{Ni}$ for the value $DP_{N1}$ to derive each area $A_{Ti}$. The slot volume $V_{SLOTN}$ can thereby be approximated by utilizing the values $A_{Ti}$ in equation (20).

Since the angular orientation of the armature paint mark relative to the cutter has been previously determined, and since the armature cross-sectional configuration is known, it is also known whether one or two slots will be intercepted during a cutting operation. When two slots will be intercepted, the block 106 calculates the individual slot volumes $V_{SLOTN1}$ and $V_{SLOTN2}$ intercepted by the cutter and adds the individual slot volumes to derive an indication of the total slot volume $V_{SLOTN}$. In general, the block 106 separately calculates each individual slot volume $V_{SLOTN1}$ and $V_{SLOTN2}$ according to the procedure described above for the case of a single slot volume which is intercepted by the cutter. Of course, for other armature configurations it is possible that more than two slots will be intercepted during a cutting operation. In such a case the block 106 calculates the separate slot volumes and adds the volumes to calculate the total slot volume.

Referring again to FIG. 5c, following the block 106, a block 108 calculates a value $V_{TN}$ equal to:

$$V_{TN} = V_{1N} - V_{SLOTN} \qquad (24)$$

In other words, the block 108 subtracts the approximate volume of the slots from the approximate volume calculated using Simpson's Rule to derive a total volume which would be removed from the armature laminations using the cutter 50 in a simple depth cut to an overall cut depth of $DP_{N1}$.

A block 110 then compares the value $V_{TN}$ against a calculated value of the volume required to be removed for the particular cut as determined by dividing the weight to be removed $WT_N$ by the density of the armature lamination. If these two values do not closely approximate one another, then an iterative process is undertaken to cause these two values to be approximately equal.

If the block 110 determines that the two values compared therein do not closely approximate one another, then a block 112 increases the value $DP_{N1}$ by a small amount $\Delta D$. The resulting value is then compared against the maximum value $DP_{NMAX}$ by a block 114. If the value $DP_{N1}$ is less than or equal to the maximum overall depth of cut as represented by the value $DP_{NMAX}$, then a block 116 recalculates the value $V_{1N}$ utilizing the new value for the variable $DP_{N1}$. Control then returns to the block 106 and the block 108 to recalculate the values $V_{SLOTN}$ and $V_{TN}$.

Control remains in the loop consisting of the blocks 106–116 until the value $V_{TN}$ closely approximates the volume required to be removed as determined by dividing the weight to be removed by the density of the material. Once this has been found to be the case by the block 110, control passes to a block 118, FIG. 5d.

If either of the blocks 104 or 114 determines that the value of $DP_{N1}$ has exceeded the maximum overall depth that is permitted, then control passes to a block 120, FIG. 5c, which sets the value of $DP_{N1}$ equal to the maximum depth of cut. In this case, it has been determined that the required weight removal for the cut cannot be accomplished by means of a simple depth cut. Instead, the required weight removal must be accomplished by means of a combined depth and axial cut.

It should be noted that, instead of effecting a combined depth and axial cut at the required location, it is possible to effect a simple depth cut to the maximum overall depth of cut and add the required remaining weight 180° opposite the depth cut, if desired.

Following the block 120, a block 122 increments the value of a variable $\Delta x$ representing the length of the axial cut. In general, the value $\Delta x$ is incremented a small amount by the block 122 and is utilized by a block 124 to recalculate the volume $V_{1N}$ according to the following equation:

$$V_{1N} = V_{1N} + \left( \frac{\pi R^2 (2\lambda)}{360} - \frac{R^2 \sin(2\lambda)}{2} \right) \Delta x \qquad (25)$$

where $\lambda = \cos^{-1}\left( \frac{R - DP_{NMAX}}{R} \right)$

Following the block 124, a block 125 increments the value of $V_{SLOTN}$ by the quantity of $A_{T1}\Delta x$ which represents the increase in slot volume caused by the increase in axial travel $\Delta x$ of the cutter 50. Control then returns to the block 108 where the total volume $V_{TN}$ is recalculated and is compared by the block 110. Control remains in the blocks 108–114 and 120–125 until the block 110 determines that the total volume $V_{TN}$ closely approximates the weight required to be removed divided by the density of the armature material.

Figure 5D:
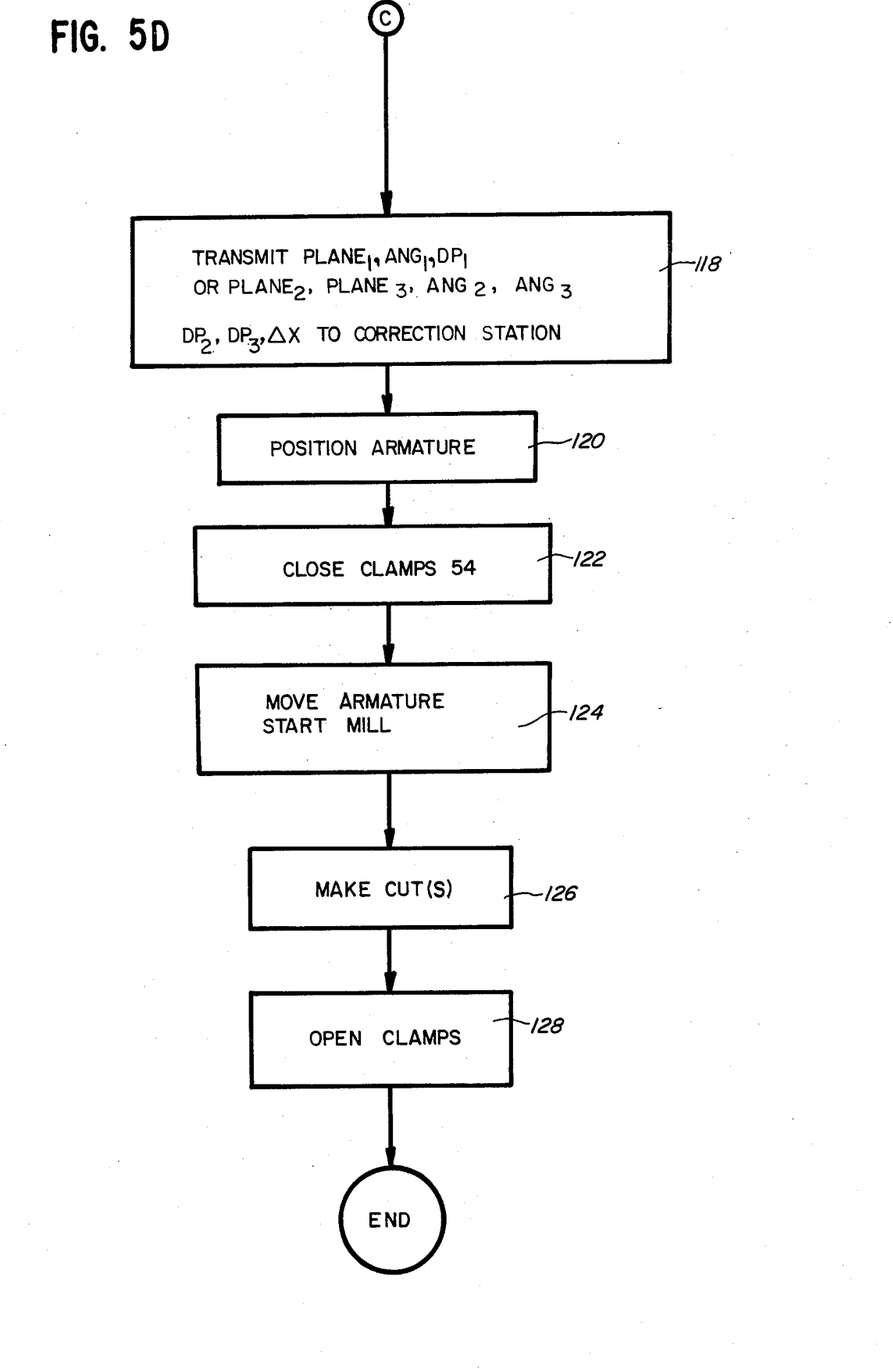

Once this condition has been achieved, control passes to the block 118, FIG. 5d, which transmits the cutting parameters to the correction station 24. The operator of the balancing system then transfers the armature 26 to clamp 54. Once this has been effected, a block 120 moves the armature 26 into the proper angular position by actuating the third stepper motor 64 through the programmable controller 72 to rotate the armature to the appropriate position for milling. The paint mark is detected by the sensor 66 and the motor 64 is deactuated at the appropriate time to accurately position the armature.

A block 122 then closes the clamp 54 to maintain the armature in the correct position. A block 124 energizes the motor 52 for the milling cutter 50 through the mill controller 74 and energizes the stepper motors 60,62 as appropriate to move the armature 26 into engagement with the milling cutter. A block 126 carries out the milling operation, following which a block 128 releases the clamp to complete the balancing operation.

Following the balancing operation, the armature 26 may again be placed into the unbalance detection unit 20 for further processing, if desired.

Since the volume of the slots is taken into account when determining the depth of cut, a cylindrical milling cutter can be used rather than a contour cutter which costs substantially more than the cylindrical cutter. Moreover, a contour cutter must cut with regard to the slot openings to prevent the raising of burrs at the marginal edges of the armature teeth. This consideration may prevent the removal of material at the required location to minimize the unbalance when a contour cutter is used. This need not be considered when using a cylindrical cutter.

It is estimated that, of the armatures tested on the unbalance correction unit, approximately 45% would require one milling cut to achieve a balanced condition and up to 5% of the armature would require two milling cuts.

The method of the present invention can be utilized to effect mass compensation (either weight substraction or addition) at any point on the armature other than on the lamination stack, if desired; however, the lamination stack includes a large mass of material which facilitates such mass compensation.

We claim:
1. A method of balancing a rotary body
wherein the body includes spaces therein at various locations, comprising the steps of:
rotating the body in first and second spaced bearings, the location of the first and second bearings defining first and second bearing planes, respectively;
sensing the forces in the first and second bearing planes caused by rotation of the body;
determining from the sensed forces the magnitude and angular location of a mass compensation to the rotary body which if effected at such location, would substantially statically balance the body;

choosing an axial location for the mass compensation which would reduce to a minimum the dynamic unbalance of the body;

comparing the minimum dynamic unbalance against a specified limit to determine whether such unbalance is acceptable; and effecting the mass compensation if the minimum dynamic unbalance is acceptable including the steps of removing material of a particular weight from the rotary body using a cutter by in turn determining from the particular weight and the angular and axial locations the amount by which the total volume of the rotary body is to be reduced by the cutter.

2. The method of claim 1, including the further step of:

selecting first and second axial locations for first and second mass compensations, respectively, if the minimum dynamic unbalance is unacceptable;

determining the magnitude and angular locations of each mass compensation to reduce the unbalance to a minimum; and effecting the first and second mass compensations.

3. The method of claim 1, wherein the step of determining the amount includes the steps of:

calculating an initial depth of cut for the cutter;

deriving from the initial depth of cut an approximate indication of the total reduction in volume of the rotary body if the cutter cuts to the initial depth;

determining from the initial depth of cut the total volume of the spaces intercepted by the cutter if the cutter cuts to the initial depth;

subtracting the total volume of the spaces from the total reduction in volume to calculate the volume of material removed if the cutter cuts to the initial depth;

comparing the volume of material removed against a desired volume equal to the particular weight divided by the density of the material; and varying the depth of cut until the volume of material removed approximates the desired volume.

4. The method of claim 3 wherein the step of determining includes the further step of limiting the depth of cut to a maximum value.

5. The method of claim 4, wherein the step of determining includes the further step of calculating the axial travel of the cutter required to cause the volume of material removed to approximate the desired volume when the depth of cut is limited.

6. The method of claim 1, wherein the step of determining includes the step of summing the forces around one of the bearing planes.

7. A method of balancing a rotary body having voids therein at various locations, comprising the steps of:

rotating the body in first and second spaced bearings, the location of the first and second bearings defining first and second bearing planes, respectively;

sensing the forces in the first and second bearing planes caused by rotation of the body;

determining the weight and angular location of a mass which, if removed from the body, would substantially statically balance the body;

choosing an axial location of the mass to be removed which reduces to a minimum the dynamic unbalance of the body; and removing the weight at the determined angular and axial locations using a cutter including the step of determining from the weight and the angular and axial locations the amount by which the total volume of the rotary body is to be reduced by the cutter taking into account the voids in the body.

8. The method of claim 7, wherein the step of choosing includes the steps of:

(a) selecting an initial axial plane;

(b) simulating removal of the mass at the angular location in the selected axial plane and calculating the forces which would result from rotation of the rotary body with the mass removed;

(c) selecting a different axial plane;

(d) repeating steps (b) and (c) until the calculated forces are reduced to a minimum.

9. The method of claim 7, including the further steps of comparing the minimum dynamic unbalance against a predetermined limit to determine whether such unbalance is unacceptable, and, if so, inhibiting the mass removal.

10. The method of claim 9, including the further steps of selecting first and second axial planes in which first and second mass removals are to be effected, respectively, and determining first and second weights to be removed and first and second angular locations for the first and second mass removals, respectively.

11. The method of claim 10, wherein the mass removal is effected by a cylindrical cutter including the further step of determining the depth of cut for each mass removal required to remove the first and second weights from the rotary body.

12. A method of balancing a rotary body having voids therein, comprising the steps of:

rotating the body in first and second spaced bearings, the location of the first and second bearings defining first and second bearing planes, respectively;

sensing the forces in the first and second bearing planes caused by rotation of the body;

determining first and second weights to be removed at first and second angular locations, respectively, which weight removals would substantially statically balance the body;

selecting first and second axial planes in which the first and second weight removals are to be effected, respectively, which would reduce to a minimum the dynamic unbalance of the body;

comparing the minimum dynamic unbalance against a predetermined limit to determine whether such unbalance in unacceptable;

removing the weights at the determined angular and axial locations only if the minimum dynamic unbalance is acceptable using a cylindrical cutter; and determining the depth of cut for each weight removal required to remove the first and second weights from the rotary body including the steps of (a) selecting an initial depth of cut for the cutter, (d) deriving from the selected depth of cut an approximate indication of the total reduction in volume of the rotary body if the cutter cuts to the initial depth, (c) determining the total volume of the voids intercepted by the cutter if it cuts to the initial depth, (d) subtracting the total volume of the spaces from the total reduction in volume to calculate the volume of material which would be removed by the cutter, (e) comparing the volume of material removed against a desired volume equal to the weight to be removed divided by the density of the material, (f) selecting a different depth of cut and (g) repeating steps (b)–(f) until the volume of material removed approximates the desired volume.

13. The method of claim 12, wherein the step (f) includes the step of limiting the depth of cut to a maximum value.

14. The method of claim 13, including the further step of calculating the axial travel of the cutter required to cause the volume of material removed to approximate the desired volume when the depth of cut is limited.

15. The method of claim 7, wherein the step of sensing the forces includes the step of detecting the position of the rotary body when the forces are at a maximum.

16. The method of claim 15, wherein the detecting step includes the step of sensing a paint mark on the rotary body by means of an optical sensor.

17. An apparatus for reducing an unbalanced condition in a rotary body having voids therein, comprising:

a pair of spaced bearings for supporting the rotary body;

means for rotating the rotary body in the bearings, such rotation causing forces to be transmitted to the bearings;

a force sensor coupled to each bearing for developing a signal representing the forces developed in the bearing;

a computer coupled to the force sensors for determining the position of the rotary body when the forces are at a maximum to in turn derive in the bearings an indication of the magnitude and angle of the unbalanced condition; and a milling cutter controlled by the computer for effecting a mass compensation to the rotary body to reduce the unbalanced condition wherein the computer includes means for determining a weight to be removed from the rotary body at an angular and axial location on the body to effect the mass compensation and means for calculating the total volume of the rotary body which must be removed to effect the mass compensation from the determined weight, the angular and axial locations and taking into account the voids in the rotary body.

18. The apparatus of claim 17, wherein the rotating means comprises a friction drive engaging the rotary body.

19. The apparatus of claim 18, wherein the friction drive includes a pair of idlers, an O-ring around the idlers contacting the rotary body and means for driving the idlers and O-ring to rotate the rotary body.

20. The apparatus of claim 17, wherein the computer further includes means for simulating such mass compensation and means for calculating the magnitude of the unbalanced condition remaining after such simulated mass compensation.

21. The apparatus of claim 20, wherein the computer further includes means for selecting a pair of locations for mass compensation if the the magnitude of the unbalanced condition remaining after the simulated mass compensation exceeds a particular limit.

22. The apparatus of claim 17, wherein the milling cutter comprises a cylindrical cutter and wherein the computer includes means for calculating the depth of cut required to remove a particular weight of material from the rotary body to minimize the unbalanced condition.

23. The apparatus of claim 22, wherein the calculating means includes means for limiting the depth of cut to a maximum value.

24. The apparatus of claim 23, wherein the calculating means further includes means for determining an axial distance of travel of the cutter relative to the rotary body at the maximum depth of cut required to remove the particular weight.

25. A system for balancing a rotary part having voids therein, comprising:

an unbalance detection unit, including means for rotating the rotary part, means for sensing the forces developed at first and second points on the part, means for selecting an angular and an axial location on the part at which material is to be removed to minimize the static and dynamic unbalance in the part, means for determining the weight of material to be removed at the selected location, and means for calculating the volume of material to be removed at the selected location to effect removal of the determined weight taking into account the voids in the rotary part; and an unbalance correction unit coupled to the unbalance detection unit, including a cutter, means for positioning the part relative to the cutter so that the cutter is positioned at the selected location on the part, and means for operating the cutter and the positioning means so that the calculated volume of material is removed from the part.

26. The system of claim 25, wherein the selecting means, calculating means and determining means are implemented in a single computer.

27. The system of claim 25, wherein the positioning means comprises a plurality of stepper motors coupled to the part.

28. The system of claim 25, wherein the positioning means includes:

an x-y table movable by a pair of stepper motors;

a clamp disposed on the x-y table for grasping the rotary part;

a third stepper motor coupled to the part for rotating the part to a particular angular orientation relative to the cutter; and means for controlling the stepper motors and the clamp to accurately position the cutter at the selected location on the part.

29. The system of claim 28, wherein the controlling means comprises a programmable controller.

* * * * *